United States Patent
Guizilini et al.

(10) Patent No.: US 11,822,621 B2
(45) Date of Patent: Nov. 21, 2023

(54) SYSTEMS AND METHODS FOR TRAINING A MACHINE-LEARNING-BASED MONOCULAR DEPTH ESTIMATOR

(71) Applicant: Toyota Research Institute, Inc., Los Altos, CA (US)

(72) Inventors: Vitor Guizilini, Santa Clara, CA (US); Rares A. Ambrus, San Francisco, CA (US); Adrien David Gaidon, Mountain View, CA (US); Jie Li, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 317 days.

(21) Appl. No.: 17/218,720

(22) Filed: Mar. 31, 2021

(65) Prior Publication Data
US 2022/0156971 A1    May 19, 2022

Related U.S. Application Data

(60) Provisional application No. 63/113,477, filed on Nov. 13, 2020.

(51) Int. Cl.
*G06T 7/73* (2017.01)
*G06T 7/50* (2017.01)
(Continued)

(52) U.S. Cl.
CPC ...... *G06F 18/2178* (2023.01); *G06F 18/2148* (2023.01); *G06T 7/50* (2017.01);
(Continued)

(58) Field of Classification Search
CPC ... G06F 18/2178; G06F 18/2148; G06T 7/74; G06T 7/50; G06T 9/002;
(Continued)

(56) References Cited

U.S. PATENT DOCUMENTS 10,353,271 B2 * 7/2019 Wang ............... G03B 3/02
11,082,681 B2 * 8/2021 Godard ............. G06T 7/73
(Continued)

OTHER PUBLICATIONS

Zou, et al. "Confidence Regularized Self-Training". In the IEEE International Conference on Computer Vision (ICCV), Oct. 2019.
(Continued)

*Primary Examiner* — Gregory M Desire
(74) *Attorney, Agent, or Firm* — Christopher G. Darrow; Darrow Mustafa PC

(57) ABSTRACT

Systems and methods described herein relate to training a machine-learning-based monocular depth estimator. One embodiment selects a virtual image in a virtual dataset, the virtual image having an associated ground-truth depth map; generates a set of ground-truth surface-normal vectors for pixels in the virtual image based on the ground-truth depth map; processes the virtual image using the machine-learning-based monocular depth estimator to generate a predicted depth map; generates a set of calculated surface-normal vectors for the pixels in the virtual image based on the predicted depth map; and supervises training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

20 Claims, 3 Drawing Sheets

(51) Int. Cl.

| | |
|---|---|
| G06F 18/21 | (2023.01) |
| G06T 9/00 | (2006.01) |
| G06V 20/56 | (2022.01) |
| G06V 20/64 | (2022.01) |
| G06F 18/214 | (2023.01) |

(52) U.S. Cl.
CPC ............... *G06T 7/74* (2017.01); *G06T 9/002* (2013.01); *G06V 20/56* (2022.01); *G06V 20/64* (2022.01); *G06T 2207/10024* (2013.01); *G06T 2207/10028* (2013.01); *G06T 2207/20081* (2013.01); *G06T 2207/20084* (2013.01)

(58) Field of Classification Search
CPC . G06T 2207/10024; G06T 2207/10028; G06T 2207/20081; G06T 2207/20084; G06V 20/64; G06V 20/56

See application file for complete search history.

(56) References Cited

U.S. PATENT DOCUMENTS

| | | | | |
|---|---|---|---|---|
| 11,128,854 | B2* | 9/2021 | Badrinarayanan | G06T 7/593 |
| 11,321,853 | B2* | 5/2022 | Ji | G06T 7/579 |
| 11,367,206 | B2* | 6/2022 | Lin | G06T 7/13 |
| 11,429,805 | B2* | 8/2022 | Ren | G06V 30/248 |
| 11,430,146 | B2* | 8/2022 | Yan | G06T 7/593 |
| 11,589,031 | B2* | 2/2023 | Khamis | H04N 5/33 |
| 11,648,945 | B2* | 5/2023 | Sajjadi Mohammadabadi | B60W 30/09 382/104 |
| 2019/0130275 | A1 | 5/2019 | Chen et al. | |
| 2022/0138977 | A1* | 5/2022 | Yan | G06T 3/0093 382/154 |

OTHER PUBLICATIONS

Zou, et al. "Unsupervised Domain Adaptation for Semantic Segmentation via Class-Balanced Self-Training". In Proceedings of the European conference on computer vision (ECCV), pp. 289-305, 2018.

Vu et al., "DADA: Depth-Aware Domain Adaptation in Semantic Segmentation". found at: arXiv:1904.01886v3 [cs.CV] Aug. 19, 2019.

Chen et al., "Surface Normals in the Wild," IEEE Xplore, 2017, found at https://openaccess.thecvf.com/content_ICCV_2017/paper/Chen_Surface_Normals_in_ICCV_2017_paper.pdf.

Zhen et al., "Self-Supervised Learning for Single View Depth and Surface Normal Estimation," arXiv:1903.00112v1, Mar. 1, 2019, available at https://arxiv.org/pdf/1903.00112.pdf.

Yang et al., "Unsupervised Learning of Geometry from Videos with Edge-Aware Depth-Normal Consistency," arXiv:1711.03665v1, Nov. 10, 2017, available at https://arxiv.org/pdf/1711.03665.pdf.

Yin et al., "Enforcing Geometric Constraints of Virtual Normal for Depth Prediction," IEEE Xplore, 2019, found at https://openaccess.thecvf.com/content_ICCV_2019/papers/Yin_Enforcing_Geometric_Constraints_of_Virtual_Normal_for_Depth_Prediction_ICCV_2019_paper.pdf.

Ren et al., "Cross-Domain Self-Supervised Multi-Task Feature Learning Using Synthesis Imagery," Proceedings of the IEEE Conference on Computer Vision and Pattern Recognition, 2018, pp. 762-771, available at https://openaccess.thecvf.com/content_cvpr_2018/papers/Ren_Cross-Domain_Self-Supervised_Multi-Task_CVPR_2018_paper.pdf.

Zhou, et al., "Learning Dense Correspondence via 3D-guided Cycle Consistency". In Proceedings of the IEEE Conference on Computer Vision and Pattern Recognition, pp. 117-126, 2016.

de Souza et al., "Generating Human Action Videos by Coupling 3D Games Engines and Probabilistic Graphical Models". found at: arXiv:1910.06699v1 [cs.CV] Oct. 12, 2019.

Bousmalis et al., "Unsupervised pixellevel domain adaptation with generative adversarial networks". found at: arXiv:1612.05424v2 [cs.CV] Aug. 23, 2017.

Zhou et al., "Unsupervised Learning of Depth and Ego-Motion from Video". found at: arXiv:1704.07813v2 [cs.CV] Aug. 1, 2017.

Zhou et al., "Stereo Magnification: Learning view synthesis using multiplane images". found at: arXiv:1805.09817v1 [cs.CV] May 24, 2018.

Ganin et al., "Domain-Adversarial Training of Neural Networks". fJMLR, 17(1):2096-2030, Jan. 2016.

Hur et al., "Self-Supervised Monocular Scene Flow Estimation". In CVPR, 2020.

Jin et al., "Unsupervised Hard Example Mining from Videos for Improved Object Detection". . In European Conference on Computer Vision (ECCV), 2018.

Peng et al., "Learning Deep Object Detectors from 3D Models". found at: arXiv:1412.7122v4 [cs.CV] Oct. 12, 2015.

Tzeng et al., "Deep Domain Confusion: Maximizing for Domain Invariance". found at: arXiv:1412.3474v1 [cs.CV] Dec. 10, 2014.

Valada et al., "Self-Supervised Model Adaptation for Multimodal Semantic Segmentation". found at: arXiv:1808.03833v3 [cs.CV] Jul. 8, 2019.

Yan et al. "Learning Domain-Invariant Subspace using Domain Features and Independence Maximization". found at: arXiv:1603.04535v2 [cs.CV] Jun. 22, 2017.

Volpi et al., "Adversarial Feature Augmentation for Unsupervised Domain Adaptation". found at: arXiv:1711.08561v2 [cs.CV] May 4, 2018.

Flynn et al., "DeepStereo: Learning to Predict New Views from the World's Imagery" found at: arXiv:1506.06825v1 [cs.CV] Jun. 22, 2015.

Zheng et al., "Unsupervised Scene Adaptation with Memory Regularization in vivo". found at: arXiv:1912.11164v2 [cs.CV] Jan. 26, 2020.

Lee at al., "Spigan: Privileged Adversarial Learning From Simulation". found at: arXiv:1810.03756v3 [cs.CV] Feb. 18, 2019.

Chen et al., "Learning Semantic Segmentation from Synthetic Data: A Geometrically Guided Input-Output Adaptation Approach". found at: https://openaccess.thecvf.com/content_CVPR_2019/papers/Chen_Learning_Semantic_Segmentation_From_Synthetic_Data_A_Geometrically_Guided_Input-Output_CVPR_2019_paper.pdf.

Unknown, "The New Data Pipeline for Computer Vision," 6 pages, retrieved from: https://paralleldomain.com/ (last accessed Oct. 29, 2021).

Ranjan et al., "Competitive Collaboration: Joint Unsupervised Learning of Depth, Camera Motion, Optical Flow and Motion Segmentation," 19 pages, arXiv:1805.09806v3 [cs.CV] Mar. 11, 2019.

Tang et al., "Discriminative Adversarial Domain Adaptation," The Thirty-Fourth AAAI Conference on Artificial Intelligence (AAAI-20), pp. 5940-5947 (2020).

Alhaija, et al., "Augmented Reality Meets Computer Vision: Efficient Data Generation for Urban Driving Scenes". International Journal of Computer Vision (IJCV), 2018, arXiv:1708.01566v1 [cs.CV] Aug. 4, 2017.

Cabon, et al., "Virtual Kitti 2". found at: arXiv:2001.10773v1 [cs.CV] Jan. 29, 2020.

Carlucci, et al., "Domain Generalization by Solving Jigsaw Puzzles". In Proceedings of the IEEE Conference on Computer Vision and Pattern Recognition, pp. 2229-2238, 2019.

Cordts, et al., "The Cityscapes Dataset for Semantic Urban Scene Understanding". In IEEE conference on computer vision and pattern recognition, pp. 3213-3223, 2016.

Deng, et al., "ImageNet: A Large-Scale Hierarchical Image Database". In Proceedings of the IEEE Conference on Computer Vision and Pattern Recognition, 2009.

Eigen, et al., "Predicting Depth, Surface Normals and Semantic Labels with a Common Multi-Scale Convolutional Architecture". In 2015 IEEE International Conference on Computer Vision (ICCV), pp. 2650-2658, 2015.

Eigen, et al., "Depth Map Prediction from a Single Image using a Multi-Scale Deep Network". In Advances in neural Information processing systems, pp. 2366-2374, 2014, arXiv:1406.2283v1 [cs.CV] Jun. 9, 2014.

(56) References Cited

OTHER PUBLICATIONS

Gaidon, et al., "Virtual Worlds as Proxy for Multi-Object Tracking Analysis". In Proceedings of the IEEE conference on computer vision and pattern recognition, pp. 4340-4349, 2016.
Garg, et al., "Unsupervised CNN for Single View Depth Estimation: Geometry to the Rescue". In European Conference on Computer Vision, pp. 740-756. Springer, 2016, arXiv:1603.04992v2 [cs.CV] Jul. 29, 2016.
Geiger, et al., "Vision meets robotics: The KITTI dataset". The International Journal of Robotics Research, 32(11):1231-1237, 2013.
Geiger, et al., "Are We Ready for Autonomous Driving? The KITTI Vision Benchmark Suite". In Conference on Computer Vision and Pattern Recognition (CVPR), 2012.
Ghifary, et al., "Deep Reconstruction-Classification Networks for Unsupervised Domain Adaptation". In European Conference on Computer Vision, pp. 597-613. Springer, 2016, arXiv:1607.03516v2 [cs.CV] Aug. 1, 2016.
Gidaris, et al., "Unsupervised Representation Learning by Predicting Image Rotations". found at: arXiv preprint arXiv:1803.07728, 2018, arXiv:1803.07728v1 [cs.CV] Mar. 21, 2018.
Godard, et al., "Unsupervised Monocular Depth Estimation with Left-Right Consistency." In CVPR, vol. 2, p. 7, 2017.
Godard, et al., "Digging into self-supervised monocular depth estimation". In Proceedings of the IEEE/CVF International Conference on Computer Vision (ICCV), 2019, pp. 3828-3838.
Gordon, et al., "Depth from Videos in the Wild: Unsupervised Monocular Depth Learning from Unknown Cameras." In Proceedings of the IEEE International Conference on Computer Vision, pp. 8977-8986, 2019.
Guizilini, et al., "3D Packing for Self-Supervised Monocular Depth Estimation". In International Conference on Computer Vision and Pattern Recognition (CVPR), 2020.
Guizilini, et al., "Semantically-Guided Representation Learning for Self-Supervised Monocular Depth", arXiv preprint arXiv:2002.12319, 2020, arXiv:2002.12319v1 [cs.CV] Feb. 27, 2020.
He, et al., "Deep Residual Learning for Image Recognition". In Proceedings of the IEEE conference on computer vision and pattern recognition, pp. 770-778, 2016.
Hoffman, et al., "CyCADA: Cycle-Consistent Adversarial Domain Adaptation". In International conference on machine learning, pp. 1989-1998. PMLR, 2018.
Mei, et al., "Instance Adaptive Self-Training for Unsupervised Domain Adaptation". In European Conference on Computer Vision (ECCV), 2020, arXiv:2008.12197v1 [cs.CV] Aug. 27, 2020.
Larsson et al., "Learning representations for automatic colorization". found at: arXiv:1603.06668v2 [cs.CV] Jul. 28, 2016.
Lee, et al., "From Big to Small: Multi-Scale Local Planar Guidance for Monocular Depth Estimation". found at: aarXiv:1907.10326v5 [cs.CV] Mar. 6, 2020.
Li, et al., "Content-Consistent Matching for Domain Adaptive Semantic Segmentation". In European Conference on Computer Vision (ECCV), 2020.
Loshchilov, et al., "Decoupled Weight Decay Regularization". In International Conference on Learning Representations, 2019, arXiv:1711.05101v3 [cs.LG] Jan. 4, 2019.
Luo, et al.,"Taking a Closer Look at Domain Shift: Category-level Adversaries for Semantics Consistent Domain Adaptation". In The IEEE Conference on Computer Vision and Pattern Recognition (CVPR), 2019.
Misra, et al., "Cross-stitch Networks for Multi-task Learning." In 2016 IEEE Conference on Computer Vision and Pattern Recognition (CVPR), pp. 3994-4003, 2016.

Noroozi et al., "Unsupervised Learning of Visual Representations by Solving Jigsaw Puzzles". lound at arXiv: 1603.09246v3 [cs.CV] Aug. 22, 2017.
Paszke et al., "Automatic differentiation in pytorch". In NIPS-W, 2017.
Patel et al. "Visual domain adaptation: A survey of recent advances". IEEE signal processing magazine, 32(3):53-69, 2015.
Pohlen, et al., "Full-Resolution Residual Networks for Semantic Segmentation in Street Scenes". In Proceedings of the IEEE Conference on Computer Vision and Pattern Recognition, pp. 4151-4160, 2017.
Richter, et al., "Playing for Data: Ground Truth from Computer Games". In European conference on computer vision, pp. 102-118. Springer, 2016, arXiv:1608.02192v1 [cs.CV] Aug. 7, 2016.
Ros, et al., "The SYNTHIA Dataset: A Large Collection of Synthetic Images for Semantic Segmentation of Urban Scenes". In Proceedings of the IEEE conference on computer vision and pattern recognition, pp. 3234-3243, 2016.
RoyChowdhury, et al., "Automatic Adaptation of Object Detectors to New Domains Using Self-Training". In IEEE Conference on Computer Vision and Pattern Recognition (CVPR), 2019.
Shu, et al., "Feature-metric Loss for Self-supervised Learning of Depth and Egomotion". In ECCV, 2020, arXiv:2007.10603v1 [cs.CV] Jul. 21, 2020.
Subhani, et al., "Learning from Scale-Invariant Examples for Domain Adaptation in Semantic Segmentation". In European Conference on Computer Vision (ECCV), 2020, arXiv:2007.14449v1 [cs.CV] Jul. 28, 2020.
Sun, et al.,"Unsupervised Domain Adaptation Through Self-Supervision". found at: arXiv preprint arXiv:1909.11825, 2019, arXiv:1909.11825v2 [cs.LG] Sep. 29, 2019.
Tsai, et al., "Domain Adaptation for Structured Output via Discriminative Patch Representations". In IEEE International Conference on Computer Vision (ICCV), 2019.
Vasiljevic, et al., "Neural Ray Surfaces for Self-Supervised Learning of Depth and Ego-motion". found at: arXiv:2008.06630v1 [cs.CV] Aug. 15, 2020.
Vu, et al., "ADVENT: Adversarial Entropy Minimization for Domain Adaptation in Semantic Segmentation." In CVPR, 2019.
Wang, et al., "Deep Visual Domain Adaptation: A Survey". found at: arXiv:1802.03601v4 [cs.CV] May 25, 2018.
Wang, et al., "Image Quality Assessment: From Error Visibility to Structural Similarity". IEEE transactions on image processing, 13(4):600-612, 2004.
Wilson, et al., "A Survey of Unsupervised Deep Domain Adaptation. ACM Transactions on Intelligent Systems and Technology (TIST)". found at: arXiv:1812.02849v3 [cs.LG] Feb. 6, 2020.
Wu, et al., "DCAN: Dual Channel-wise Alignment Networks for Unsupervised Scene Adaptation." In Proceedings of the European Conference on Computer Vision (ECCV), pp. 518-534, 2018.
Wu, et al., "Bridging Category-level and Instance-level Semantic Image Segmentation". found at: arXiv preprint arXiv:1605.06885, 2016, arXiv:1605.06885v1 [cs.CV] May 23, 2016.
Xu, et al., "Self-Supervised Domain Adaptation for Computer Vision Tasks". IEEE Access, 7:156694-156706, 2019.
Yang, et al., "FDA: Fourier Domain Adaptation for Semantic Segmentation". In Proceedings of the IEEE/CVF Conference on Computer Vision and Pattern Recognition (CVPR), Jun. 2020.
Zhao et al., "Loss functions for image restoration with neural networks". found at: arXiv:1511.08861v3 [cs.CV] Apr. 20, 2018.
Zhou, et al., "Unsupervised Learning of Depth and Ego-Motion from Video." In CVPR, vol. 2, p. 7, 2017.

\* cited by examiner

SYSTEMS AND METHODS FOR TRAINING A MACHINE-LEARNING-BASED MONOCULAR DEPTH ESTIMATOR

CROSS-REFERENCE TO RELATED APPLICATION

This application claims the benefit of U.S. Provisional Patent Application No. 63/113,477, "Geometric Self-Supervision for Domain Adaptation," filed Nov. 13, 2020, which is incorporated by reference herein in its entirety.

TECHNICAL FIELD

The subject matter described herein relates in general to robots and, more specifically, to systems and methods for training a machine-learning-based monocular depth estimator.

BACKGROUND

In a variety of robotics applications, including autonomous vehicles and Advanced Driver-Assistance Systems (ADASs), the robot estimates depth (distance or range) to support navigation, obstacle avoidance, and other decision-making tasks. This is sometimes accomplished using three-dimensional sensors such as Light Detection and Ranging (LIDAR) sensors, but depth can also be estimated from a single two-dimensional image. Such an approach is sometimes referred to as "monocular depth estimation." In some implementations, a machine-learning-based monocular depth estimation system is trained using sample training images. Obtaining accurate depth estimates from such a system can be challenging and remains an active area of research because a variety of factors during the training process can negatively impact the accuracy of the depth estimates output by the resulting trained system.

SUMMARY

An example of a system for training a machine-learning-based monocular depth estimator is presented herein. The system comprises one or more processors and a memory communicably coupled to the one or more processors. The memory stores an input module including instructions that when executed by the one or more processors cause the one or more processors to select a virtual image in a virtual dataset, the virtual image having an associated ground-truth depth map. The input module also includes instructions that cause the one or more processors to generate a set of ground-truth surface-normal vectors for pixels in the virtual image based on the ground-truth depth map. The memory also stores a training module including instructions that when executed by the one or more processors cause the one or more processors to process the virtual image using the machine-learning-based monocular depth estimator to generate a predicted depth map. The training module also includes instructions that cause the one or more processors to generate a set of calculated surface-normal vectors for the pixels in the virtual image based on the predicted depth map. The training module also includes instructions that cause the one or more processors to supervise training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

Another embodiment is a non-transitory computer-readable medium for training a machine-learning-based monocular depth estimator and storing instructions that when executed by one or more processors cause the one or more processors to select a virtual image in a virtual dataset, the virtual image having an associated ground-truth depth map. The instructions also cause the one or more processors to generate a set of ground-truth surface-normal vectors for pixels in the virtual image based on the ground-truth depth map. The instructions also cause the one or more processors to process the virtual image using the machine-learning-based monocular depth estimator to generate a predicted depth map. The instructions also cause the one or more processors to generate a set of calculated surface-normal vectors for the pixels in the virtual image based on the predicted depth map. The instructions also cause the one or more processors to supervise training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

Another embodiment is a method of training a machine-learning-based monocular depth estimator, the method comprising selecting a virtual image in a virtual dataset, the virtual image having an associated ground-truth depth map. The method also includes generating a set of ground-truth surface-normal vectors for pixels in the virtual image based on the ground-truth depth map. The method also includes processing the virtual image using the machine-learning-based monocular depth estimator to generate a predicted depth map. The method also includes generating a set of calculated surface-normal vectors for the pixels in the virtual image based on the predicted depth map. The method also includes supervising training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
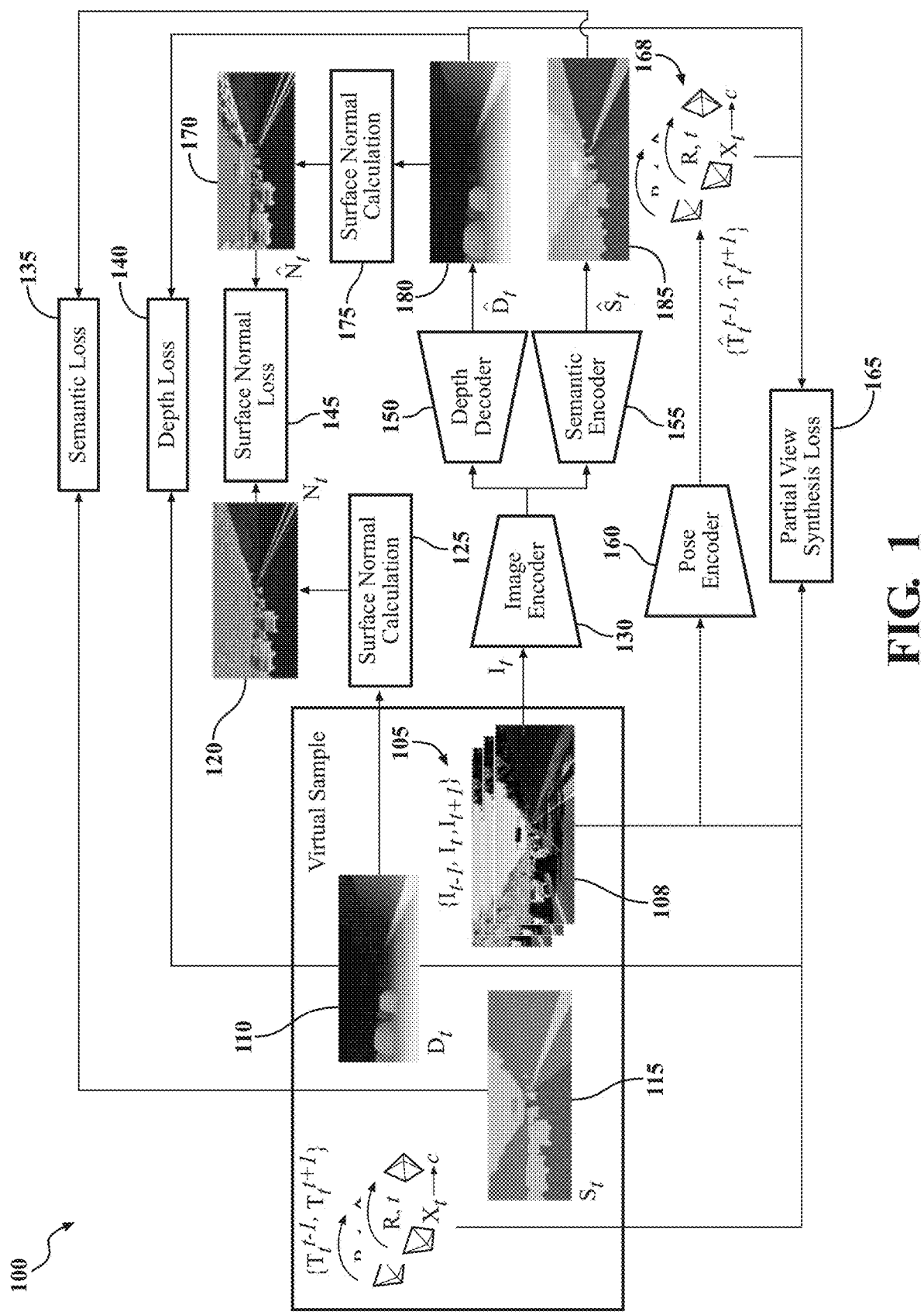
FIG. 1 illustrates a virtual sample processing flow of a machine-learning-based monocular depth estimation training system, in accordance with an illustrative embodiment of the invention.

Various embodiments of systems and methods for training a machine-learning-based monocular depth estimator described herein improve the accuracy of machine-learning-based monocular depth estimation by including a regularization technique for self-supervised training that uses supervision from virtual datasets (i.e., image data obtained from a computer simulator). In a simulator, it is possible to produce densely annotated labels with exact ground-truth information, a feat that is usually unattainable under real-life conditions due to sensor limitations, sparsity, and noisy data. Specifically, the regularization technique just mentioned takes advantage of densely annotated ground-truth depth maps to generate ground-truth surface normal vectors (hereinafter sometimes referred to as "surface normals"). By including a loss function between the surface normals calculated from predicted depth maps and ground-truth surface normals, it is possible to generate depth maps that are more accurate and consistent than when only conventional depth-prediction loss is used. In some embodiments, the regularization term—a surface-normal loss—is computed as a cosine similarity function.

In various embodiments, a system for training a machine-learning-based monocular depth estimator selects a virtual image from a virtual dataset (a collection of computer-generated images). Such a virtual image has an associated ground-truth depth map. Such a ground-truth depth map includes a ground-truth distance (range) from a camera for each pixel in the corresponding virtual image. In some embodiments, the ground-truth depth map represents those respective pixel distances as grayscale intensities. That is, the ground-truth depth map is itself a type of image.

In these various embodiments, the system generates a set of ground-truth surface-normal vectors for the pixels in the virtual image based on the ground-truth depth map. Herein, a "surface normal vector" (or "surface normal") is a vector that is perpendicular to a surface (e.g., of an object) at a particular pixel within an image. In some embodiments, the surface normals are unit vectors.

In these various embodiments, the system processes the virtual image using the machine-learning-based monocular depth estimator to be trained (e.g., one or more neural networks) to generate a predicted depth map, and the system also generates a set of calculated surface-normal vectors for the pixels in the virtual image based on the predicted depth map.

In these various embodiments, the system supervises the training of the machine-learning-based monocular depth estimator by, among other things, computing a surface-normal loss between the set of calculated surface-normal vectors and the set of ground-truth surface-normal vectors. The surface-normal loss can be used to regularize the depth predictions produced by the machine-learning-based monocular depth estimator to improve the accuracy of the depth predictions as the machine-learning-based monocular depth estimator is trained. That is, the resulting trained monocular depth estimator produces more accurate depth predictions (or estimates) for real input image data than a similar monocular depth estimator that has not benefitted from the surface-normal-loss supervision described herein during the training process. The improved machine-learning-based monocular depth estimator has wide application to, for example, autonomous vehicles, semi-autonomous vehicles, Advanced Driver-Assistance Systems (ADASs), search and rescue robots, aerial drones, and various kinds of indoor robots (manufacturing robots, service robots, etc.).

Referring to FIG. 1, a virtual sampling processing flow 100 of a machine-learning-based monocular depth estimation training system (hereinafter "training system") is illustrated, in accordance with an illustrative embodiment of the invention. "Virtual sampling" in connection with FIG. 1 refers to training a machine-learning-based monocular depth estimator using a virtual dataset (a collection of virtual images-images generated by a computer). In some embodiments, real image data is also used during the training process in a mixed-batch mode with virtual image data. Herein, the description focuses on the virtual-sampling aspect of the training system because that is the processing flow in which the surface-normal-loss regularization is applied.

As shown in FIG. 1, a virtual dataset 105 made up of virtual images 108 is used to train a machine-learning-based monocular depth estimator. In some embodiments, the virtual images 108 in a virtual dataset 105 are Red-Green-Blue (RGB) images. In this embodiment, a temporal context for the virtual images 108 is also assumed, the virtual images 108 being represented by the notation $\{I_{t-1}, I_t, I_{t+1}\}$ in FIG. 1. For example, the virtual images 108 can be a temporal sequence of image frames captured at periodic intervals (e.g., 10-30 frames/s) by a video camera. Each virtual image 108 (image frame) has an associated ground-truth depth map 110 (labeled $D_t$ in FIG. 1) and an associated ground-truth semantic map 115 (labeled $S_t$ in FIG. 1) containing ground-truth semantic labels. In this embodiment, there is also a ground-truth rigid transformation between frames 118 defined as $\mathcal{T}_t = \{T_t^{t-1}, T_1^{t+1}\}$, and the camera intrinsics K are assumed to be constant.

In the embodiment of FIG. 1, a virtual image 108 is input to and processed by three neural networks: (1) Depth $f_D$: $I \rightarrow \hat{D}$, which takes an input image I (a virtual image 108) and outputs a predicted depth map $\hat{D}_t$ (180); (2) Semantic $f_S: I \rightarrow \hat{S}$, which takes the same input image (108) and outputs a predicted semantic map $\hat{S}_t$ (185); and (3) Pose $f_T: \{I_a, I_b\} \rightarrow \hat{T}_a^b$, which takes a pair of images and outputs the rigid transformation T (168) between them. As shown in FIG. 1, the depth and semantic networks share the same image encoder 130, and those networks have separate decoders, depth decoder 150 and semantic decoder 155, respectively. The pose network includes a pose encoder 160.

In some embodiments, the shared backbone for the depth decoder 150 and the semantic decoder 155 is a ResNet101 network with ImageNet pre-trained weights. In these embodiments, depth decoder 150 outputs inverse depth maps at four different resolutions. Semantic decoder 155 is similar, outputting semantic logits at a single resolution, obtained by concatenating the four output scales (upsampled to the highest resolution) followed by a final convolutional layer. Also, in these embodiments, the pose encoder 160 is a ResNet18 network pre-trained on ImageNet, followed by a series of convolutions that output a 6-dimensional vector containing translation and rotation in Euler angles.

As shown in FIG. 1, surface-normal calculation 125 generates ground-truth surface-normal vectors 120 corresponding to an input virtual image 108. The ground-truth surface-normal vectors 120 are derived from the corresponding ground-truth depth map 110. Surface-normal calculation 175 generates the calculated surface-normal vectors 170 based on the predicted depth map 180.

The supervised semantic loss calculation 135 supervises semantic segmentation in the source domain using a bootstrapped cross-entropy loss between $\hat{S}$ and the ground-truth semantic labels S:

$$\mathcal{L}_S = -\frac{1}{K}\sum_{u=1}^{H}\sum_{v=1}^{W}\sum_{c=1}^{C}\mathbb{1}_{[c=y_{u,p},p_{u,v}^c<t]}\log(p_{u,v}^c),$$

where $\mathbb{1}$ denotes the indicator (or characteristic) function and $p_{u,v}^c$ denotes the predicted probability of pixel (u,v) belonging to class c. In this embodiment, the term t is a run-time threshold such that only the K worst-performing predictions are considered. In some embodiments, K=0.3× H×W.

The supervised depth loss calculation 140 employs a scale-invariant logarithmic loss composed of the sum of the variance and the weighted squared mean of the error in log space $\Delta d = \log d - \log \hat{d}$:

$$\mathcal{L}_D = \frac{1}{P}\sum_{d \in D}\Delta d^2 - \frac{\lambda}{P^2}\left(\sum_{d \in D}\Delta d\right)^2,$$

where P is the number of pixels $d \in D$ with valid depth information. The coefficient λ balances variance and error minimization. For example, in some embodiments λ=0.85.

Regarding surface-normal regularization, it should be noted that, unlike conventional implementations, the embodiment of FIG. 1 does not explicitly predict surface normals as an additional task but instead uses surface normals (170) calculated from a predicted depth map 180 as regularization to enforce certain structural properties in the predicted depth maps 180. For any pixel $p \in D$, its surface normal vector $n \in \mathbb{R}^2$ is calculated as follows:

$$n = (P_{u+1,v,0} - P_{u,v}) \times (P_{u,v+1} - P_{u,v}),$$

where $P=\phi(p,d,K)$ is the point obtained by unprojecting p into the camera frame of reference in three-dimensional (3D) space, given its depth value d and camera intrinsics K. In the embodiment of FIG. 1, the surface-normal loss calculation 145 is a measure of proximity between two surface normal vectors, namely between a calculated surface-normal vector 170 and ground-truth surface-normal vector 120. In this embodiment, the surface-normal loss calculation 145 is a cosine similarity metric defined as follows:

$$\mathcal{L}_N = \frac{1}{2P}\sum_{p \in D}\left(1 - \frac{\hat{n} \cdot n}{\|\hat{n}\|\|n\|}\right)$$

where n and $\hat{n}$ are, respectively, unitary ground-truth (120) and calculated (170) surface-normal vectors for each pixel $p \in D$.

In some embodiments, an optional partial view synthesis loss 165 is also computed. For example, in some embodiments, a partially-supervised photometric loss function is computed.

Figure 2:
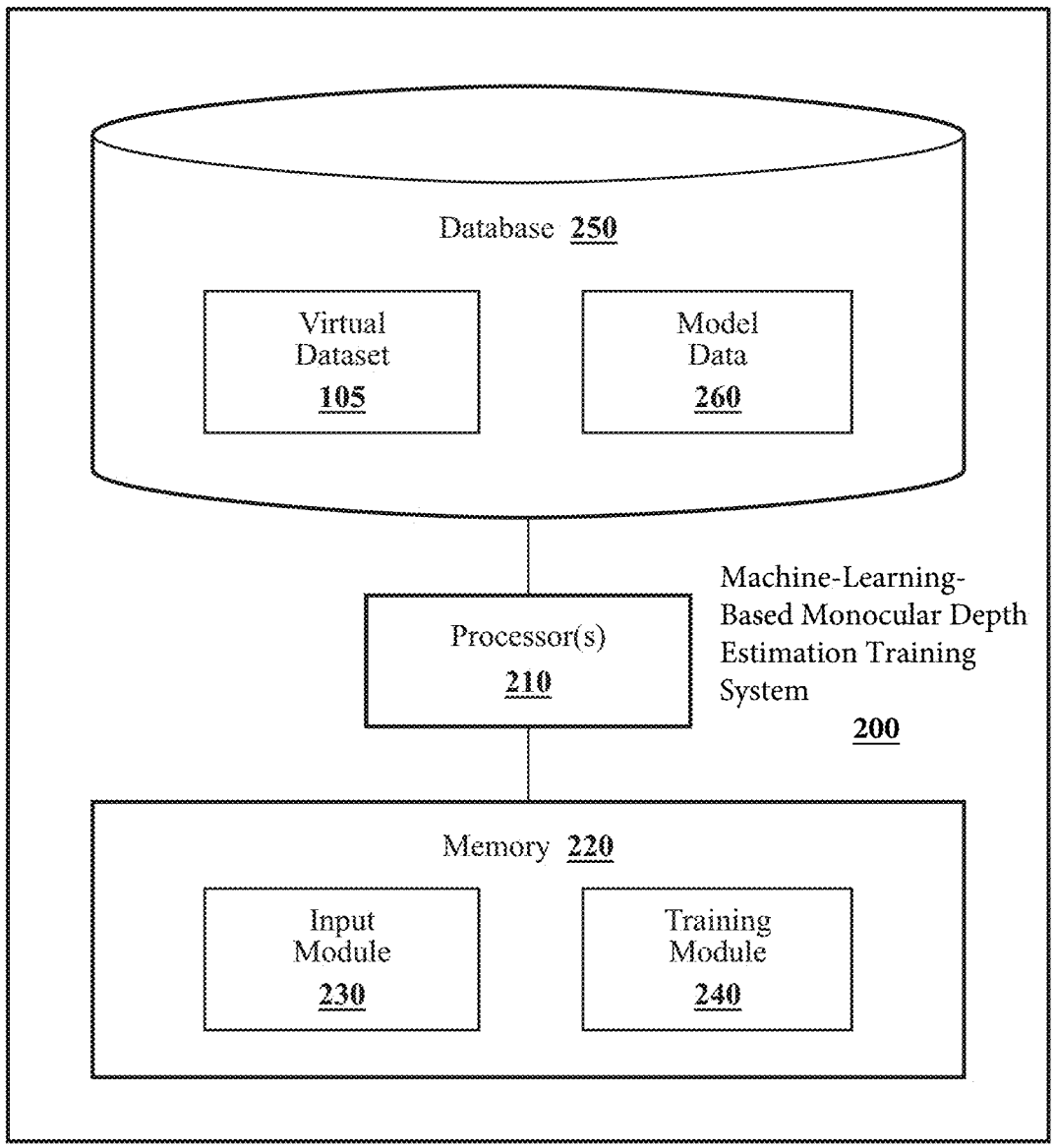
FIG. 2 is a block diagram of a machine-learning-based monocular depth estimation training system, in accordance with an illustrative embodiment of the invention.

With reference to FIG. 2, one embodiment of a machine-learning-based monocular depth estimation training system 200 (hereinafter "training system 200") is illustrated. The training system 200 is shown as including one or more processors 210. Training system 200 also includes a memory 220 communicably coupled to the one or more processors 210. The memory 220 stores an input module 230 and a training module 240. The memory 220 is a random-access memory (RAM), read-only memory (ROM), a hard-disk drive, a flash memory, or other suitable memory for storing the modules 230 and 240. The modules 230 and 240 are, for example, computer-readable instructions that when executed by the one or more processors 210, cause the one or more processors 210 to perform the various functions disclosed herein.

In connection with its tasks, training system 200 can store various kinds of data in a database 250. For example, in the embodiment shown in FIG. 2, training system 200 stores, in database 250, one or more virtual datasets 105 and various kinds of model data 260 (e.g., results of intermediate calculations, depth maps, semantic maps, surface-normal vectors, model parameters, weights for neural networks, etc.). In some embodiments, training system 200 also stores one or more real datasets containing images of the real world (not shown in FIG. 2). As mentioned above, in some embodiments, training system 200 uses a mixture of virtual images and real images to train a machine-learning-based monocular depth estimator. In such embodiments, there is a processing flow for real images similar to the virtual sampling processing flow 100 shown in FIG. 1, except that certain aspects such as surface-normal regularization are omitted.

Input module 230 generally includes instructions that when executed by the one or more processors 210 cause the one or more processors 210 to select a virtual image 108 in a virtual dataset 105, the virtual image 108 having an associated ground-truth depth map 110. As discussed above, in some embodiments, virtual dataset 105 includes virtual images 108 in RGB format. Input module 230 also includes instructions to generate a set of ground-truth surface-normal vectors 120 for pixels in the virtual image 108 based on the corresponding ground-truth depth map 110. Generating the ground-truth surface normal vectors 120 is discussed further above in connection with FIG. 1.

Training module 240 generally includes instructions that when executed by the one or more processors 210 cause the one or more processors 210 to process the virtual image 108 using the machine-learning-based monocular depth estimator (see, e.g., image encoder 130 and depth decoder 150 in FIG. 1) to generate a predicted depth map 180. As discussed above, the ground-truth depth maps 110 and the predicted depth maps 180, in some embodiments, represent respective distances, from a camera, of the pixels in the virtual image 108 as grayscale intensities. That is, the depth maps themselves are images of a special type.

Training module 240 also includes instructions to generate a set of calculated surface-normal vectors 170 for the pixels in the virtual image 108 based on the predicted depth map 180. Generating calculated surface-normal vectors 170 is discussed further above in connection with FIG. 1.

Training module 240 also includes instructions to supervise training of the machine-learning-based monocular depth estimator by computing a surface-normal loss 145 between the set of calculated surface-normal vectors 170 and the set of ground-truth surface-normal vectors 120. As discussed above, the surface-normal loss 145 regularizes the depth predictions produced by the machine-learning-based monocular depth estimator (e.g., image encoder 130 and depth decoder 150 in FIG. 1) to improve the accuracy of the depth predictions as the machine-learning-based monocular depth estimator is trained under the direction of training system 200. As discussed above, in some embodiments, training module 240 includes instructions to compute the surface-normal loss (145) as a cosine similarity function.

As also discussed above in connection with FIG. 1, training module 240, in some embodiments, includes further instructions to compute a supervised depth loss 140 between the predicted depth map 180 and the ground-truth depth map 110. The specifics of this supervised depth loss calculation 140 are discussed above in connection with FIG. 1.

Figure 3:
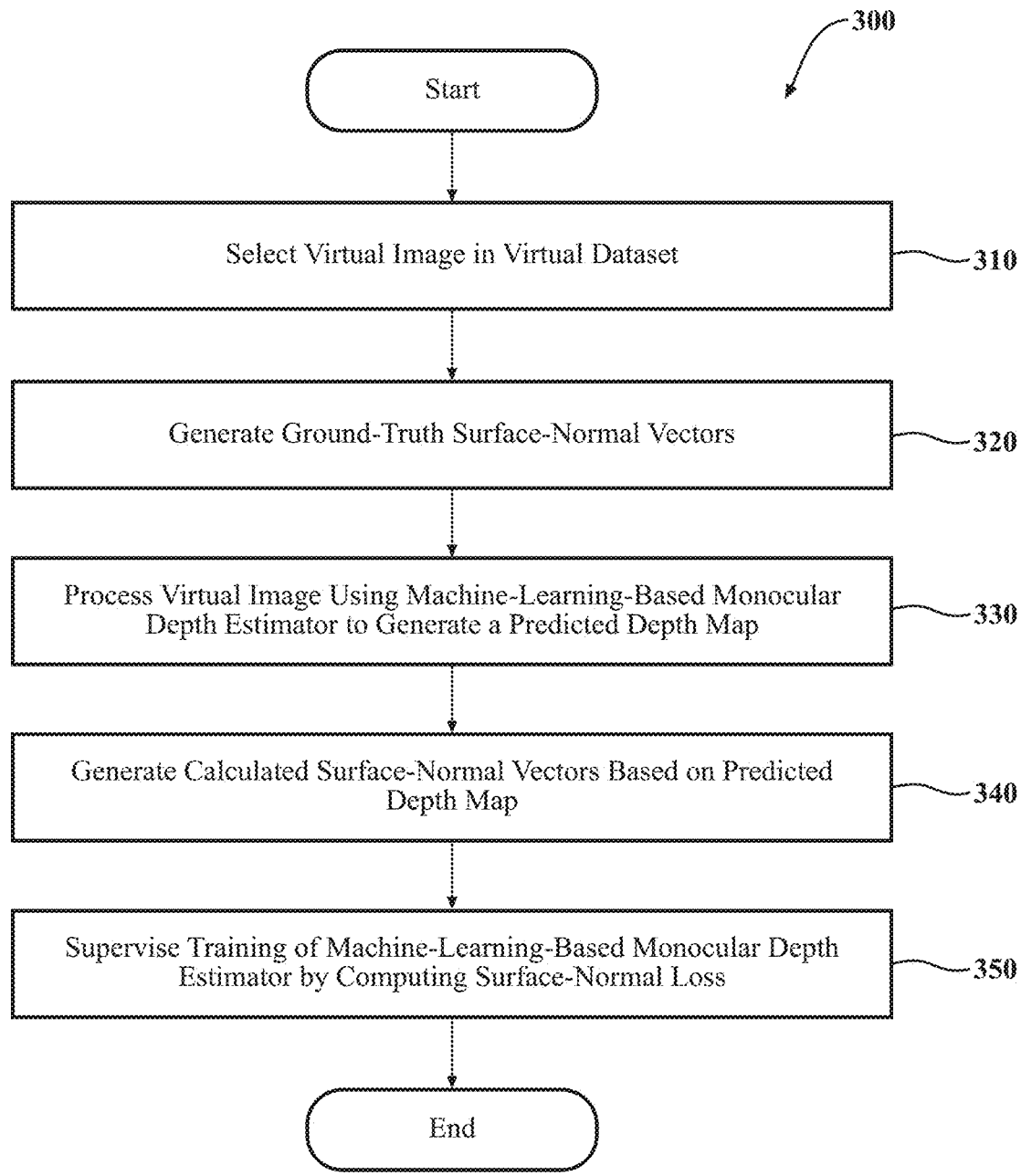
FIG. 3 is a flowchart of a method of training a machine-learning-based monocular depth estimator, in accordance with an illustrative embodiment of the invention.

FIG. 3 is a flowchart of a method of training a machine-learning-based monocular depth estimator, in accordance with an illustrative embodiment of the invention. Method 300 will be discussed from the perspective of training system 200 in FIG. 2. While method 300 is discussed in combination with training system 200, it should be appreciated that method 300 is not limited to being implemented within training system 200, but training system 200 is instead one example of a system that may implement method 300.

At block 310, input module 230 selects a virtual image 108 in a virtual dataset 105, the virtual image 108 having an associated ground-truth depth map 110. As discussed above, in some embodiments, virtual dataset 105 includes virtual images 108 in RGB format.

At block 320, input module 230 generates a set of ground-truth surface-normal vectors 120 for pixels in the virtual image 108 based on the ground-truth depth map 110. Generating the ground-truth surface normal vectors 120 is discussed further above in connection with FIG. 1.

At block 330, training module 240 processes the virtual image 108 using the machine-learning-based monocular depth estimator (e.g., image encoder 130 and depth decoder 150 in FIG. 1) to generate a predicted depth map 180. As discussed above, the ground-truth depth maps 110 and the predicted depth maps 180, in some embodiments, represent respective distances, from a camera, of the pixels in the virtual image 108 as grayscale intensities.

At block 340, training module 240 generates a set of calculated surface-normal vectors 170 for the pixels in the virtual image 108 based on the predicted depth map 180. Generating calculated surface-normal vectors 170 is discussed further above in connection with FIG. 1.

At block 350, training module 240 supervises training of the machine-learning-based monocular depth estimator by computing a surface-normal loss 145 between the set of calculated surface-normal vectors 170 and the set of ground-truth surface-normal vectors 120. As discussed above, the surface-normal loss 145 regularizes the depth predictions produced by the machine-learning-based monocular depth estimator (e.g., image encoder 130 and depth decoder 150 in FIG. 1) to improve the accuracy of the depth predictions as the machine-learning-based monocular depth estimator is trained under the direction of training system 200. As discussed above, in some embodiments, training module 240 includes instructions to compute the surface-normal loss (145) as a cosine similarity function. As also discussed above, training module 240, in some embodiments, additionally computes a supervised depth loss 140 between the predicted depth map 180 and the ground-truth depth map 110.

In the various embodiments described herein, training system 200 (or method 300) outputs a trained machine-learning-based monocular depth estimator (including, e.g., one or more trained neural networks) that can estimate a depth value for one or more pixels in a real-world input image associated with a robotics (e.g., machine-vision) application. For example, such a trained "depth network" can output a predicted depth map 180 for the real-world input image. As discussed above, such a trained depth network has broad application to, for example, autonomous vehicles, semi-autonomous vehicles, ADASs, search and rescue robots, aerial drones, and various kinds of indoor robots (e.g., manufacturing robots, service robots, etc.).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for training a machine-learning-based monocular depth estimator, the system comprising:
   one or more processors; and
   a memory communicably coupled to the one or more processors and storing:
   an input module including instructions that when executed by the one or more processors cause the one or more processors to:
   select a virtual image in a virtual dataset, the virtual image having an associated ground-truth depth map; and
   generate a set of ground-truth surface-normal vectors for pixels in the virtual image based on the ground-truth depth map; and
   a training module including instructions that when executed by the one or more processors cause the one or more processors to:
   process the virtual image using the machine-learning-based monocular depth estimator to generate a predicted depth map;
   generate a set of calculated surface-normal vectors for the pixels in the virtual image based on the predicted depth map; and
   supervise training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

2. The system of claim 1, wherein the instructions in the training module to supervise training of the machine-learning-based monocular depth estimator include further instructions to compute a supervised depth loss between the predicted depth map and the ground-truth depth map.

3. The system of claim 1, wherein the instructions in the training module to supervise training of the machine-learning-based monocular depth estimator include instructions to compute the surface-normal loss as a cosine similarity function.

4. The system of claim 1, wherein the ground-truth depth map and the predicted depth map represent respective distances, from a camera, of the pixels in the virtual image as grayscale intensities.

5. The system of claim 1, wherein the training module includes instructions to train the machine-learning-based monocular depth estimator for deployment in one of an autonomous vehicle, a semi-autonomous vehicle, an Advanced Driver-Assistance System, a search and rescue robot, an aerial drone, and an indoor robot.

6. The system of claim 1, wherein the machine-learning-based monocular depth estimator includes at least one neural network.

7. The system of claim 1, wherein the virtual image is a Red-Green-Blue (RGB) image.

8. A non-transitory computer-readable medium for training a machine-learning-based monocular depth estimator and storing instructions that when executed by one or more processors cause the one or more processors to:
selecting a virtual image in a virtual dataset, the virtual image having an associated ground-truth depth map;
generate a set of ground-truth surface-normal vectors for pixels in the virtual image based on the ground-truth depth map;
process the virtual image using the machine-learning-based monocular depth estimator to generate a predicted depth map;
generate a set of calculated surface-normal vectors for the pixels in the virtual image based on the predicted depth map; and
supervise training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

9. The non-transitory computer-readable medium of claim 8, wherein the instructions to supervise training of the machine-learning-based monocular depth estimator include further instructions to compute a supervised depth loss between the predicted depth map and the ground-truth depth map.

10. The non-transitory computer-readable medium of claim 8, wherein the instructions to supervise training of the machine-learning-based monocular depth estimator include instructions to compute the surface-normal loss as a cosine similarity function.

11. The non-transitory computer-readable medium of claim 8, wherein the ground-truth depth map and the predicted depth map represent respective distances, from a camera, of the pixels in the virtual image as grayscale intensities.

12. The non-transitory computer-readable medium of claim 8, wherein the instructions include instructions to train the machine-learning-based monocular depth estimator for deployment in one of an autonomous vehicle, a semi-autonomous vehicle, an Advanced Driver-Assistance System, a search and rescue robot, an aerial drone, and an indoor robot.

13. The non-transitory computer-readable medium of claim 8, wherein the machine-learning-based monocular depth estimator includes at least one neural network.

14. A method of training a machine-learning-based monocular depth estimator, the method comprising:
selecting a virtual image in a virtual dataset, the virtual image having an associated ground-truth depth map;
generating a set of ground-truth surface-normal vectors for pixels in the virtual image based on the ground-truth depth map;
processing the virtual image using the machine-learning-based monocular depth estimator to generate a predicted depth map;
generating a set of calculated surface-normal vectors for the pixels in the virtual image based on the predicted depth map; and
supervising training of the machine-learning-based monocular depth estimator by computing a surface-normal loss between the set of calculated surface-normal vectors and the set of ground-truth surface-normal vectors, wherein the surface-normal loss regularizes depth predictions produced by the machine-learning-based monocular depth estimator to improve accuracy of the depth predictions as the machine-learning-based monocular depth estimator is trained.

15. The method of claim 14, wherein supervising training of the machine-learning-based monocular depth estimator further includes computing a supervised depth loss between the predicted depth map and the ground-truth depth map.

16. The method of claim 14, wherein the surface-normal loss is computed as a cosine similarity function.

17. The method of claim 14, wherein the ground-truth depth map and the predicted depth map represent respective distances, from a camera, of the pixels in the virtual image as grayscale intensities.

18. The method of claim 14, wherein the machine-learning-based monocular depth estimator is trained for deployment in one of an autonomous vehicle, a semi-autonomous vehicle, an Advanced Driver-Assistance System, a search and rescue robot, an aerial drone, and an indoor robot.

19. The method of claim 14, wherein the machine-learning-based monocular depth estimator includes at least one neural network.

20. The method of claim 14, wherein the virtual image is a Red-Green-Blue (RGB) image.

* * * * *